Aug. 21, 1951    F. McCURTAIN    2,565,038
ELECTRIC BRAKE
Filed Sept. 3, 1946
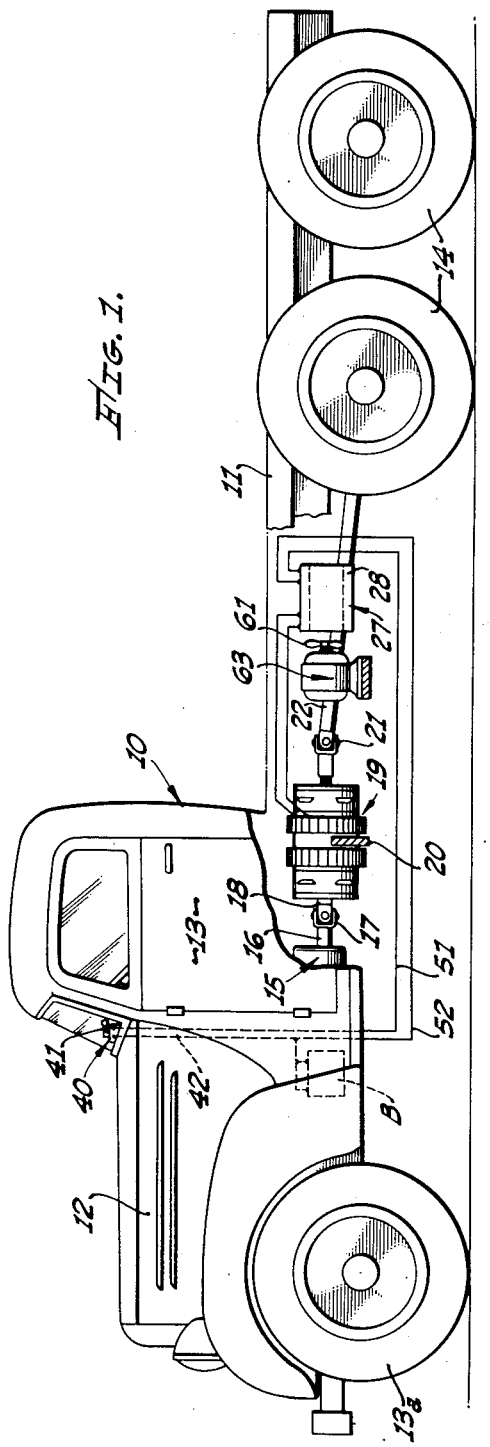
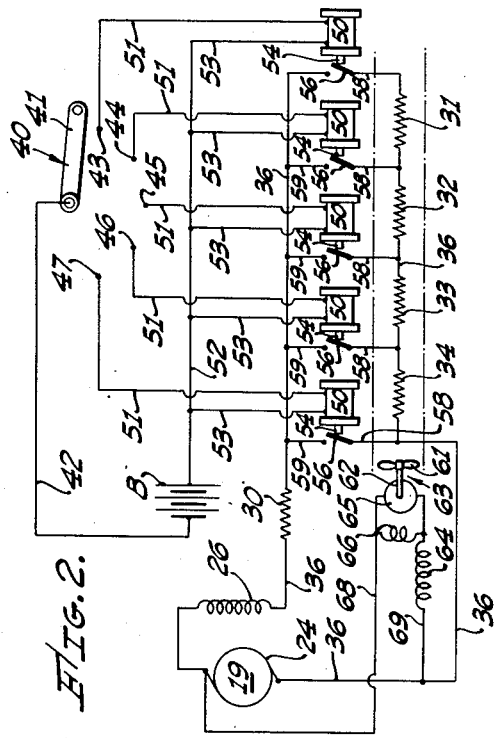
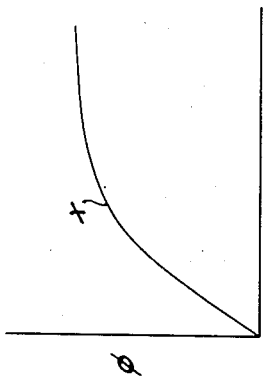
FRANK McCURTAIN,
INVENTOR
BY Edwin D. Jones
ATTORNEY.

Patented Aug. 21, 1951

2,565,038

UNITED STATES PATENT OFFICE 2,565,038

ELECTRIC BRAKE

Frank McCurtain, Los Angeles, Calif., assignor, by mesne assignments, to Harold W. Tamka, Reno, Nev., as trustee Application September 3, 1946, Serial No. 694,621

2 Claims. (Cl. 172—285)

The present invention relates to vehicle brakes in general and particularly to an electrical brake for vehicles. More specifically the invention comprises an operator-controlled electrical brake characterized by its ability to provide necessary braking power for heavy duty trucks.

Automotive trucks have increased enormously in size, weight and speed during recent years. Today the highways are traveled by trucks weighing tens of thousands of pounds at speeds substantially as great as the speeds of passenger cars. This great increase in weight and speed has made essential the provision of greater braking power. As much power is required to brake a large weight traveling at high speed as is required to accelerate it to that speed. Ordinary friction brakes of large capacity hydraulically actuated and with their power supplemented by air-pressure-actuated boosters are capable of doing a remarkable job. Such brakes, however, are subject to the inherent weakness that the energy absorbed must be dissipated at the friction brake linings, normally positioned at the supporting wheels, in the form of heat. Although made of the finest of materials, these linings are subject to wear and, when going down long grades, as for example, through the mountains in the western part of the country, it is possible to burn and to destroy the effectiveness of the friction surfaces by applying the brake pressure continuously. The heat generated simply is not dissipated with sufficient rapidity and accumulates resulting in the actual burning of the material.

In the electrical brake constructed in accordance with the present invention the objectionable weaknesses of limited power and life which characterize the earlier friction brake are eliminated. Rubbing friction surfaces are dispensed with and in their place is substituted an electrical generating unit and a current absorbing heat dissipating unit. Operator operable means are also provided by which the electrical output of the unit is controlled at various speeds for the purpose of controlling the effective braking action. The generating unit is preferably directly connected to a rotating part of the vehicle drive so that its operational speed is proportional to the vehicle speed. By providing a current generating unit having the proper electrical characteristics it is possible to provide a braking action which, at any particular setting of the manual control, is directly proportional to the vehicle speed. The electrical power which is generated by the braking action is proportional to the extent of that action and must be eliminated. At high vehicle speeds and under fast braking action, the braking power and the heat to be dissipated are great, and in the present invention means are provided to vary the heat dissipating capacity with the maximum amount of heat to be eliminated, a feature of great importance.

With an appreciation of the weaknesses of the earlier braking units and of the advantages of a unit having the characteristics mentioned, it is an object of the present invention to provide a new and improved electrical brake for ambulatory vehicles.

It is another object of the invention to provide an electrical brake for a vehicle capable of providing maximum braking power for its size.

A further object of the invention is to provide an electrical brake for an ambulatory vehicle characterized by the straight-line relationship existing between the braking power available and the vehicle speed; and A still further object of the invention is to provide an electric brake for a vehicle incorporating a heat dissipating unit in which the heat dissipating capacity varies directly with the brake load.

These and other more specific objects will appear upon reading the following description of a preferred embodiment of the invention and upon considering in connection therewith the attached drawing relative thereto.

Referring now to the drawing in which a preferred embodiment of the invention is illustrated:

Figure 1 is a side view of an automotive truck with certain parts broken away in order better to show the application of the present invention;

Figure 2 is a diagrammatic showing of the electrical circuit embodied in the present invention; and Figure 3 is a diagrammatic showing of a saturation curve of the generator embodied in the present invention.

In the drawings a truck is indicated generally by the reference character 10 and is seen to comprise an elongated frame 11 supporting forwardly a driving motor 15 preferably of the combustion type and positioned principally within the hood 12. The driver's cab 13 is located immediately in the rear of hood 12, as in the usual construction, and the chassis is movably supported upon front and rear wheels 13a and 14, respectively, there being two of the latter upon each side, a fact indicative of the size and weight of the vehicle.

The driving shaft 16 of motor 15 is seen to connect directly through a universal joint 17 to the shaft 18 of an electrical generator indicated generally by the reference character 19. The latter is suitably supported from the vehicle frame 11 by means including a bracket 20. At its rear end generator shaft 18, which in the manner of the usual generator carries an armature and is suitably carried by unshown bearings within the unit, is connected through a second universal joint 21 to a second drive shaft 22. The latter extends rearwardly to connect through a suitable differential of standard design to the axles of rear wheels 14. It is clear that the armature shaft 18 forms, in fact, a part of the power transmission means between the driving motor and the driven rear wheels.

Generator 19 is a series generator and is characterized by the fact that during the operation of the vehicle at all speeds above approximately twenty-five miles per hour, its own operation is above the knee, indicated by the "X" in Figure 3, of the saturation curve. This, in effect, means that further increase in strength of the field, indicated by the abscissa NI (ampere turns) in Figure 3, produces no appreciable increase in the field flux, indicated by ordinates. As a result, the voltage generated will vary substantially in a straight line relationship with the increase of generator speed while operating above the knee "X."

The generator, as is shown diagrammatically in Figure 2, comprises an armature 24 and a series field 26. To control the current generated, and so the load which the generator places upon the rotating vehicle shaft, means are provided to insert and to remove series connected resistances. These resistances are preferably located in a single unit, indicated generally by the reference character 27 in Figure 1, suitably suspended from the vehicle frame 11 in a tunnel-like heat insulating casing 28 open at its opposite ends. In one preferred embodiment there are five such resistance elements, indicated by the reference characters 30, 31, 32, 33, and 34, respectively, in Figure 3, all connected in series with each other and with the opposite sides of generator 19 by a conductor 36. Obviously at any given speed of rotation of the armature of generator 19 the current generated will vary inversely with the resistance connected in series therewith. With line 36 open no current will flow, and with the circuit closed any removal of resistance will increase the current flow and so the load which the generator places upon the vehicle shaft.

To enable the vehicle operator to control the power which the generator generates and so the braking load it places upon the vehicle, a control unit indicated generally by the reference character 40 is positioned in the driver's cab 13. As is seen most clearly in Figure 2, control unit 40 includes a pivotable lever 41 connected at its pivotal axis by a conductor 42 with a battery B. Lever 41 comprises a movable contact and is adapted to cooperate sequentially with five fixed contacts 43, 44, 45, 46 or 47 and also to assume the open-circuit position as illustrated in Figure 2. A solenoid 50 is connected to each of the stationary contacts referred to by a lead 51 and to a conductor 52 by a lead 53, the latter connecting to the battery B. The closing of the movable contact 41 with the stationary contact 43 effects the energization of the solenoid 50 connected thereto so that its armature 54 is shifted longitudinally to effect the closing of a normally open switch 56. Leads 58 connect the various switches 56 to conductor 36 at points adjacent and between the resistances 31, 32, 33, and 34, the resistances being in series as stated, while leads 59 connect directly to the lead 36 upon the field side of the generator. It is to be noted that the end switch 56 actuated by the solenoid connected to contact 43 is in series with the main lead 36.

The movement of the switch lever 41 from its illustrated open position into contact with stationary contact 43 effects the energization of the end solenoid 50, resulting in the movement of the latter's armature to close the adjacent switch 56. With the generator armature rotating, as in the movement of the vehicle, the current generated would be limited by the presence of all of the resistances 30 to 34, inclusive, in series with the generator. Movement of the lever 41 to the second stationary contact 44 effects the energization of its connected solenoid 50 which immediately closes adjacent switch 56. Resistance 31 is then short-circuited and the amount of current flowing, all other things remaining unchanged, is increased to increase the power generated and so the load upon the driven shaft provided by the generator. Maximum current will flow at any given speed with element 41 in connection with stationary contact 47 which as indicated, effects the energization of its solenoid 50 to close the adjacent switch 56 to short-circuit all of the resistance elements 31 to 34, inclusive, only resistance 30, which can be relatively small, being left in series with the generator to limit the current flow.

The power absorbed by the generator 19 from the rotating vehicle shaft is transformed into electrical energy which is absorbed by the resistances 30 to 34 inclusive. In these resistances this energy is transformed into heat which varies in amount directly as the square of the current generated. This heat must be dissipated and the simplest and most economical method is to dissipate it to the ambient atmosphere. The greater the volume of air contacting the resistance elements the greater will be the heat carried away and to provide maximum heat transference, a fan 61 is provided which is mounted directly on the shaft 62 of a differential compound motor indicated generally by the reference character 63. One field winding 64 of motor 63 is in series with its armature 65 while a shunt field 66 is so related to field 64 that as the impressed voltage increases the net or resulting field is weakened to provide a substantially constant field strength. The desirable feature of this relationship is that the motor speed will vary substantially directly with the impressed voltage. As clearly seen in Figure 2, motor 63 is connected by means of leads 68 and 69 to opposite sides of the generator armature 24 so that the voltage across the motor varies directly with the voltage generated by the generator.

In the operation of the brake system constructed in accordance with the present invention, and during normal vehicle operation, the braking control lever 41 will be positioned in open position illustrated diagrammatically in Figure 2. When so positioned none of the solenoids 50 is energized and no current flows through the generator, the switches 56 all being opened. Under conditions requiring the braking of the truck, the operator needs only to pivot manually the control lever 41 from its open position, illustrated in Figure 2, into position to contact one of the stationary contacts 43, 44, 45, 46 or 47. Moving contact 41 into stationary contact 43 energizes its solenoid 50 to place all of the resistances in series with the generator 19. The presence of all of this resistance reduces the current flow to a minimum which, in terms of power, means that the generator takes a minimum amount of power from the vehicle drive shaft. If greater braking action is desired the control lever 41 is successively advanced onto contacts 44, 45, 46 and 47 to effect successively and additively the short-circuiting of resistances 31, 32, 33 and 34, respectively, to increase the current generated and accordingly to increase the power consumed by the generator. This current generated, as previously described, is dissipated as a heat loss in the resistances 30 to 34, inclusive, depending upon which are in series with the generator.

The fan-driving motor 63 is connected directly across the generator armature 24, and because of its electrical characteristics as a differential compound motor, will vary its speed, and so the speed of the fan 61, directly with the impressed voltage. Because generator 19 is working above the knee of the saturation curve the impressed voltage will vary substantially directly with the speed. As the braking power required at higher speeds is greater, it follows that the heat dissipating ability of the unit which varies with the cooling air moved by the fan 61, will increase directly with the power to be expended. The operator can gage and control the braking effort by properly positioning the control lever 41 and gradually inserting or removing resistance elements by moving the lever 41 relative to the contacts 43 to 46, inclusive.

The device is characterized by its extreme simplicity and by its ability to dissipate large amounts of power. The saving effected upon the normal brakes of the vehicle is tremendous and is effected without degenerative results in the electrical mechanism itself.

While the particular device herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A vehicle having driving means and a rotary drive shaft connected thereto, and having an electric brake which includes: a series generator in addition to said driving means and connected to said drive shaft for operation thereby, said generator being constructed and designed to operate upon the flat part of the saturation curve thereof at normal operating speeds of said shaft, and of a capacity capable of absorbing the braking load of said vehicle; a plurality of resistors connected in series with each other, and of a capacity to carry substantially the entire power output of said generator; and manually operable switching means connected to said generator and to said plurality of resistors, selectively operable to disconnect said resistors from the output of said generator without affecting said driving means or to connect said resistors in series with said generator, and thereafter to short-circuit said resistors sequentially, thereby providing a braking force for said vehicle that may be selectively varied from zero to a predetermined maximum value.

2. A vehicle having motor driving means and a rotary drive shaft connected thereto, and having an electric brake which includes: a series generator in addition to said motor driving means, said generator being constructed and designed to operate upon the flat portion of its saturation curve at normal operating speeds of said shaft, and of a capacity capable of absorbing the braking load of said vehicle; a plurality of resistors connected in series with each other, and of a capacity to absorb substantially the entire power output of said generator; manually operable switching means connected to said generator and to said plurality of resistors, selectively operable to disconnect said resistors from the output of said generator or to connect said resistors in series with said generator, and thereafter to short-circuit said resistors sequentially, thereby providing a braking force for said vehicle that may be selectively varied from zero to a predetermined maximum value; a rotary means arranged to circulate cooling air over said plurality of resistors to remove the heat dissipated thereby; and motor means coupled to said rotary means to drive the latter and permanently connected to said generator for operation thereby regardless of the position of said manually operable switching means, the speed of said motor means being determined by the output voltage of said generator.

FRANK McCURTAIN.

REFERENCES CITED

The following references are of record in the file of this patent:

UNITED STATES PATENTS

| Number | Name | Date |
| --- | --- | --- |
| 581,557 | Huff | Apr. 27, 1897 |
| 799,780 | Davis | Sept. 19, 1905 |
| 1,492,138 | Meyer | Apr. 29, 1924 |
| 1,677,633 | Harrison | July 17, 1928 |
| 2,179,319 | Binney | Nov. 7, 1939 |
| 2,317,254 | Cowin | Apr. 20, 1943 |
| 2,412,228 | Oetzel | Dec. 10, 1946 |

OTHER REFERENCES

Principles of Electrical Engineering by Gray & Wallace, 6th Ed., pp. 133 and 134, published by McGraw Hill Book Co., New York city.